(12) United States Patent
Sun et al.

(10) Patent No.: US 10,779,320 B2
(45) Date of Patent: Sep. 15, 2020

(54) CHANNEL RESERVATION SIGNAL WITH NEW RADIO PDCCH WAVEFORM

(71) Applicant: QUALCOMM Incorporated, San Diego, CA (US)

(72) Inventors: Jing Sun, San Diego, CA (US); Tamer Adel Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 15/708,949

(22) Filed: Sep. 19, 2017

(65) Prior Publication Data

US 2018/0176946 A1 Jun. 21, 2018

Related U.S. Application Data

(60) Provisional application No. 62/435,570, filed on Dec. 16, 2016.

(51) Int. Cl.
*H04W 72/04* (2009.01)
*H04W 72/14* (2009.01)
(Continued)

(52) U.S. Cl.
CPC ........... *H04W 72/14* (2013.01); *H04L 5/0037* (2013.01); *H04L 5/0048* (2013.01);
(Continued)

(58) Field of Classification Search
None
See application file for complete search history.

(56) References Cited

U.S. PATENT DOCUMENTS

| 2012/0281640 A1 | 11/2012 | Xu et al. |
| 2013/0044727 A1* | 2/2013 | Nory ..................... H04L 5/0092 370/330 |

(Continued)

OTHER PUBLICATIONS

International Search Report and Written Opinion—PCT/US2017/062933—ISA/EPO—dated Apr. 6, 2018.
(Continued)

*Primary Examiner* — Ayanah S George
(74) *Attorney, Agent, or Firm* — Patterson + Sheridan, LLP

(57) ABSTRACT

Techniques for a channel reservation signal design with a new radio (NR) physical downlink control channel waveform are provided. A method for wireless communication includes determining one or more orthogonal frequency division multiplexing (OFDM) symbols to transmit channel reservation signals, and determining a plurality of resources available for transmitting the channel reservation signals during the OFDM symbol(s). The method further includes selecting one set of resources within a plurality of resources to transmit a channel reservation signal, and transmitting the channel reservation signal in the selected set of resources to reserve a portion of spectrum for communication. Another method for wireless communication includes determining OFDM symbol(s) to monitor for channel reservation signals, determining a plurality of resources available for monitoring the channel reservation signals during the OFDM symbol(s), and monitoring for one or more channel reservation signals transmitted in a set of resources within the plurality of resources.

27 Claims, 10 Drawing Sheets

(51) Int. Cl.
*H04L 5/00* (2006.01)
*H04L 27/26* (2006.01)
*H04W 28/26* (2009.01)
*H04W 88/02* (2009.01)
*H04W 88/08* (2009.01)

(52) U.S. Cl.
CPC .......... *H04L 5/0053* (2013.01); *H04L 5/0083* (2013.01); *H04L 5/0094* (2013.01); *H04L 27/2626* (2013.01); *H04W 28/26* (2013.01); *H04W 72/042* (2013.01); *H04L 5/0007* (2013.01); *H04W 88/02* (2013.01); *H04W 88/08* (2013.01)

(56) References Cited

U.S. PATENT DOCUMENTS

| | | | |
|---|---|---|---|
| 2014/0079015 A1 | 3/2014 | Kim et al. | |
| 2014/0233474 A1 | 8/2014 | Wu et al. | |
| 2015/0049700 A1 | 2/2015 | Liu et al. | |
| 2015/0223075 A1* | 8/2015 | Bashar | H04W 16/14 370/329 |
| 2016/0014728 A1 | 1/2016 | Seo et al. | |
| 2016/0127098 A1 | 5/2016 | Ng et al. | |
| 2016/0302231 A1* | 10/2016 | Chien | H04W 74/0816 |
| 2017/0099653 A1 | 4/2017 | Yoo et al. | |
| 2017/0215200 A1* | 7/2017 | Mallik | H04W 72/1268 |
| 2017/0238272 A1* | 8/2017 | You | H04L 5/0082 370/350 |

OTHER PUBLICATIONS

Intel Corporation: "(E)PDCCH for LAA Downlink", 3GPP Draft; R1-152648, 3rd Generation Partnership Project (3GPP), Mobile Competence Centre; 650, Route Des Lucioles; F-06921 Sophia-Antipolis Cedex; France, vol. RAN WG1, Fukuoka, Japan; May 24, 2015, XP050972877, Retrieved from the Internet: URL:http://www.3gpp.org/ftp/Meetings_3GPP_SYNC/RAN1/Docs/ [retrieved on May 24, 2015], 6 pages.

Intel Corporation: "R1-1612001: Remaining Details of Signaling Support for Reserved Resources, 3GPP TSG RAN WG1 Meeting #87", Nov. 14, 2016, XP055445316, Retrieved from the Internet: URL:http://www.3gpp.org/ftp/Meetings_3GPP_SYNC/RAN1/Docs/ [retrieved on Jan. 26, 2018], 4 pages.

MEDIATEK Inc: "LAA frame Structure Design," 3GPP Draft; R1-153254 LAA Frame Structure Design, 3rd Generation Partnership Project (3GPP), Mobile Competence Centre; 650, Route Des Lucioles; F-06921 Sophia-Antipolis Cedex; France, vol. RAN WG1, No. Fukuoko, Japan; May 25, 2015-May 29, 2015, May 24, 2015, XP050970506, Retrieved from the Internet: URL:http://www.3gpp.org/ftp/Meetings_3GPP_SYNC/RAN1/Docs/ [retrieved on May 24, 2015], 8 pages.

Partial International Search Report—PCT/US2017/062933—ISA/EPO—dated Feb. 5, 2018.

* cited by examiner

CHANNEL RESERVATION SIGNAL WITH NEW RADIO PDCCH WAVEFORM

CROSS-REFERENCE TO RELATED APPLICATIONS

This application claims the benefit of U.S. Provisional Patent Application Ser. No. 62/435,570, filed Dec. 16, 2016, which is assigned to the assignee hereof and hereby expressly incorporated by reference herein.

BACKGROUND

I. Field of the Disclosure

Aspects of the present disclosure relate generally to wireless communications systems, and more particularly, to a channel reservation signal design based on new radio (NR) physical downlink control channel (PDCCH).

II. Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

As the demand for mobile broadband access continues to increase, using shared radio frequency spectrum (SRFS), which may include unlicensed radio frequency spectrum (URFS), has been considered to help solve the spectrum congestion problem for future wireless needs, not only to meet the growing demand for mobile broadband access, but also to advance and enhance the user experience with mobile communications. However, the SRFS may carry other transmissions, and therefore techniques such as listen before talk (LBT) and clear channel assessment (CCA) may be used in an effort prevent excessive interference. In certain scenarios, wireless devices operating in a shared spectrum may be asynchronous. It may be desirable to mitigate interference caused by wireless devices operating in the scared spectrum.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques for transmitting a channel reservation signal based on a new radio (NR) physical downlink control channel (PDCCH) waveform are described herein.

Certain aspects of the present disclosure provide a method that may be performed, for example, by an apparatus (e.g., base station, user equipment, etc.). The method generally includes determining one or more orthogonal frequency division multiplexing (OFDM) symbols to transmit channel reservation signals. The method also includes determining a plurality of resources available for transmitting the channel reservation signals during the one or more OFDM symbols. The method further includes selecting one set of resources within the plurality of resources to transmit a channel reservation signal. The method further yet includes transmitting the channel reservation signal in the selected set of resources to reserve a portion of spectrum for communication.

Certain aspects of the present disclosure provide an apparatus for wireless communication. The apparatus generally includes means for determining one or more orthogonal frequency division multiplexing (OFDM) symbols to transmit channel reservation signals. The apparatus also includes means for determining a plurality of resources available for transmitting the channel reservation signals during the one or more OFDM symbols. The apparatus further includes means for selecting one set of resources within the plurality of resources to transmit a channel reservation signal. The apparatus further yet includes means for transmitting the channel reservation signal in the selected set of resources to reserve a portion of spectrum for communication.

Certain aspects of the present disclosure provide an apparatus for wireless communication. The apparatus generally includes at least one processor and a memory coupled to the at least one processor. The at least one processor is generally configured to determine one or more orthogonal frequency division multiplexing (OFDM) symbols to transmit channel reservation signals. The at least one processor is also configured to determine a plurality of resources available for transmitting the channel reservation signals during the one or more OFDM symbols. The at least one processor is further configured to select one set of resources within the plurality of resources to transmit a channel reservation signal. The at least one processor is further yet configured to transmit the channel reservation signal in the selected set of resources to reserve a portion of spectrum for communication.

Certain aspects of the present disclosure provide a computer-readable medium having computer executable code stored thereon. The computer executable code generally includes code for determining one or more orthogonal frequency division multiplexing (OFDM) symbols to transmit channel reservation signals. The computer executable code also includes code for determining a plurality of resources available for transmitting the channel reservation signals during the one or more OFDM symbols. The computer executable code further includes code for selecting one set of resources within the plurality of resources to transmit a channel reservation signal. The computer executable code further yet includes code for transmitting the channel reservation signal in the selected set of resources to reserve a portion of spectrum for communication.

Certain aspects of the present disclosure provide a method that may be performed, for example, by an apparatus (e.g., base station, user equipment, etc.). The method generally includes determining one or more OFDM symbols to monitor for channel reservation signals. The method also includes determining a plurality of resources available for monitoring the channel reservation signals during the one or more OFDM symbols. The method further includes monitoring for one or more channel reservation signals transmitted in a set of resources within the plurality of resources.

Certain aspects of the present disclosure provide an apparatus for wireless communication. The apparatus generally includes means for determining one or more OFDM symbols to monitor for channel reservation signals. The apparatus also includes means for determining a plurality of resources available for monitoring the channel reservation signals during the one or more OFDM symbols. The apparatus further includes means for monitoring for one or more channel reservation signals transmitted in a set of resources within the plurality of resources.

Certain aspects of the present disclosure provide an apparatus for wireless communication. The apparatus generally includes at least one processor and a memory coupled to the at least one processor. The at least one processor is generally configured to determine one or more OFDM symbols to monitor for channel reservation signals. The at least one processor is also configured to determine a plurality of resources available for monitoring the channel reservation signals during the one or more OFDM symbols. The at least one processor is further configured to monitor for one or more channel reservation signals transmitted in a set of resources within the plurality of resources.

Certain aspects of the present disclosure provide a computer-readable medium having computer executable code stored thereon. The computer executable code generally includes code for determining one or more OFDM symbols to monitor for channel reservation signals. The computer executable code also includes code for determining a plurality of resources available for monitoring the channel reservation signals during the one or more OFDM symbols. The computer executable code further includes code for monitoring for one or more channel reservation signals transmitted in a set of resources within the plurality of resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
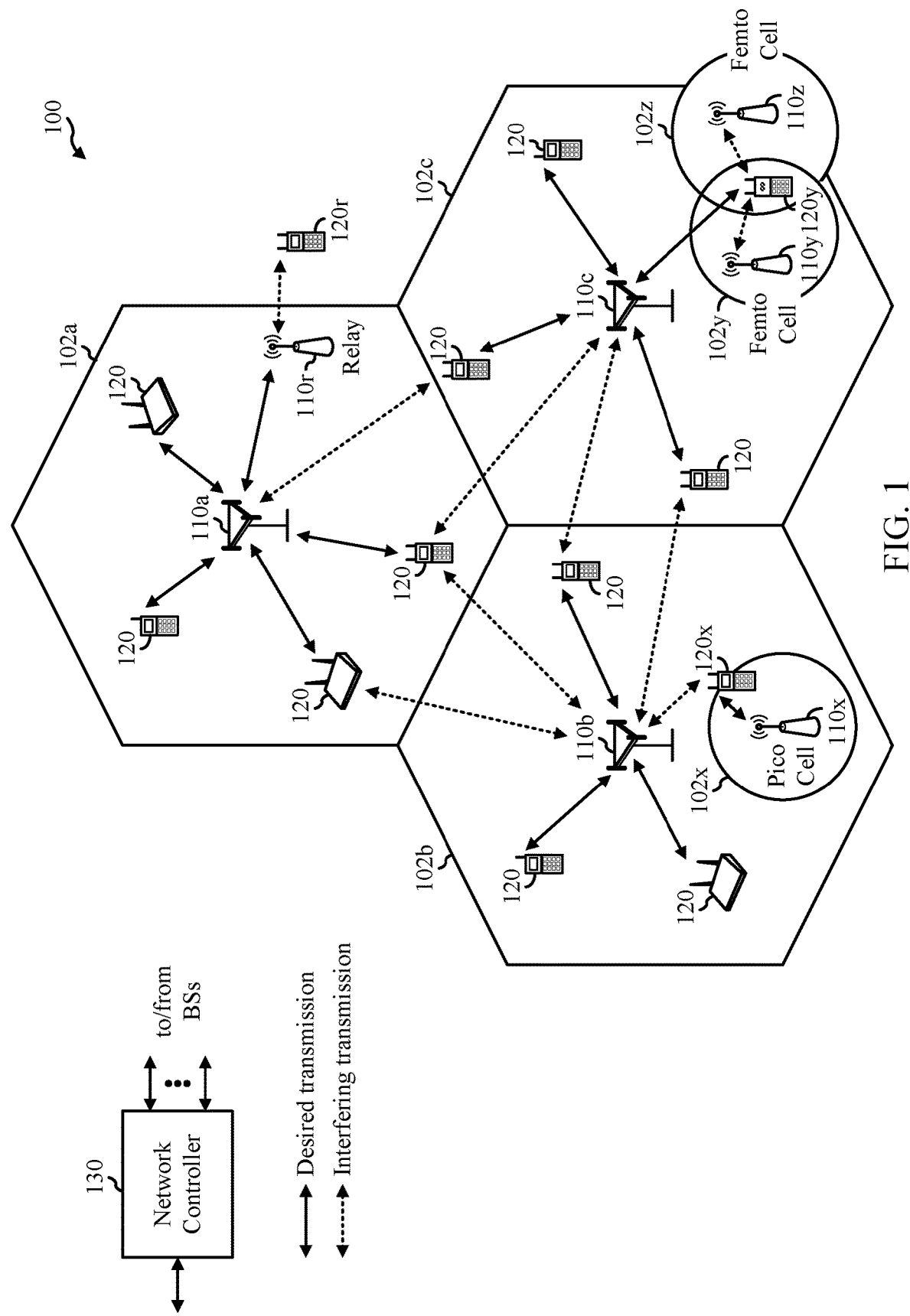
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology). NR may support various wireless communication services, such millimeter wave (mmW) targeting high carrier frequency (e.g. 60 GHz), massive multiple input multiple output (MIMO), sub-6 GHz systems, etc.

In some cases, one or more nodes in such systems may participate in an exchange of channel reservation signals to reserve channel resources from the spectrum for a desired communication (e.g., a transmission or reception). Such an exchange may allow for coexistence across nodes.

Aspects of the present disclosure provide techniques and apparatus for a channel reservation signal design based on a NR PDCCH waveform. For example, an apparatus may determine one or more orthogonal frequency division multiplexing (OFDM) symbols to transmit channel reservation signals. The apparatus may also determine a plurality of resources available for transmitting the channel reservation signals. The plurality of resources may use a NR physical downlink control channel (PDCCH) structure. The apparatus may select one set of resources within the plurality of resources to transmit a channel reservation signal, and transmit the channel reservation signal in the selected set of resources to reserve (e.g., access) a portion of spectrum (e.g., data channel) for communication. The communication, for example, may be for sending a transmission or receiving a transmission during the portion of spectrum. The apparatus may further monitor for one or more channel reservation signals transmitted in a set of resources within the plurality of resources.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) targeting wide bandwidth (e.g., 80 MHz beyond), millimeter wave (mmW) targeting high carrier frequency (e.g., 60 GHz), massive MTC (mMTC) targeting non-backward compatible MTC techniques, sub-6 GHz systems, and mission critical targeting ultra reliable low latency communications (URLLC). For these general topics, different techniques are considered, such as coding, low-density parity check (LDPC), and polar. NR cell may refer to a cell operating according to the new air interface or fixed transport layer. A NR Node B (e.g., 5G Node B) may correspond to one or multiple transmission reception points (TRPs).

Example Wireless Communications System

FIG. 1 illustrates an example wireless network 100 in which aspects of the present disclosure may be performed. For example, the wireless network may be a new radio (NR) or 5G network. As illustrated in FIG. 1, the wireless network 100 may include a number of BSs 110 and other network entities. BSs 110 in the network may be configured in different synchronous modes and/or associated with different operators. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable.

In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, a macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such as central units (CUs) and/or distributed units (DUs).

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G NB, NB, TRP, AP) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
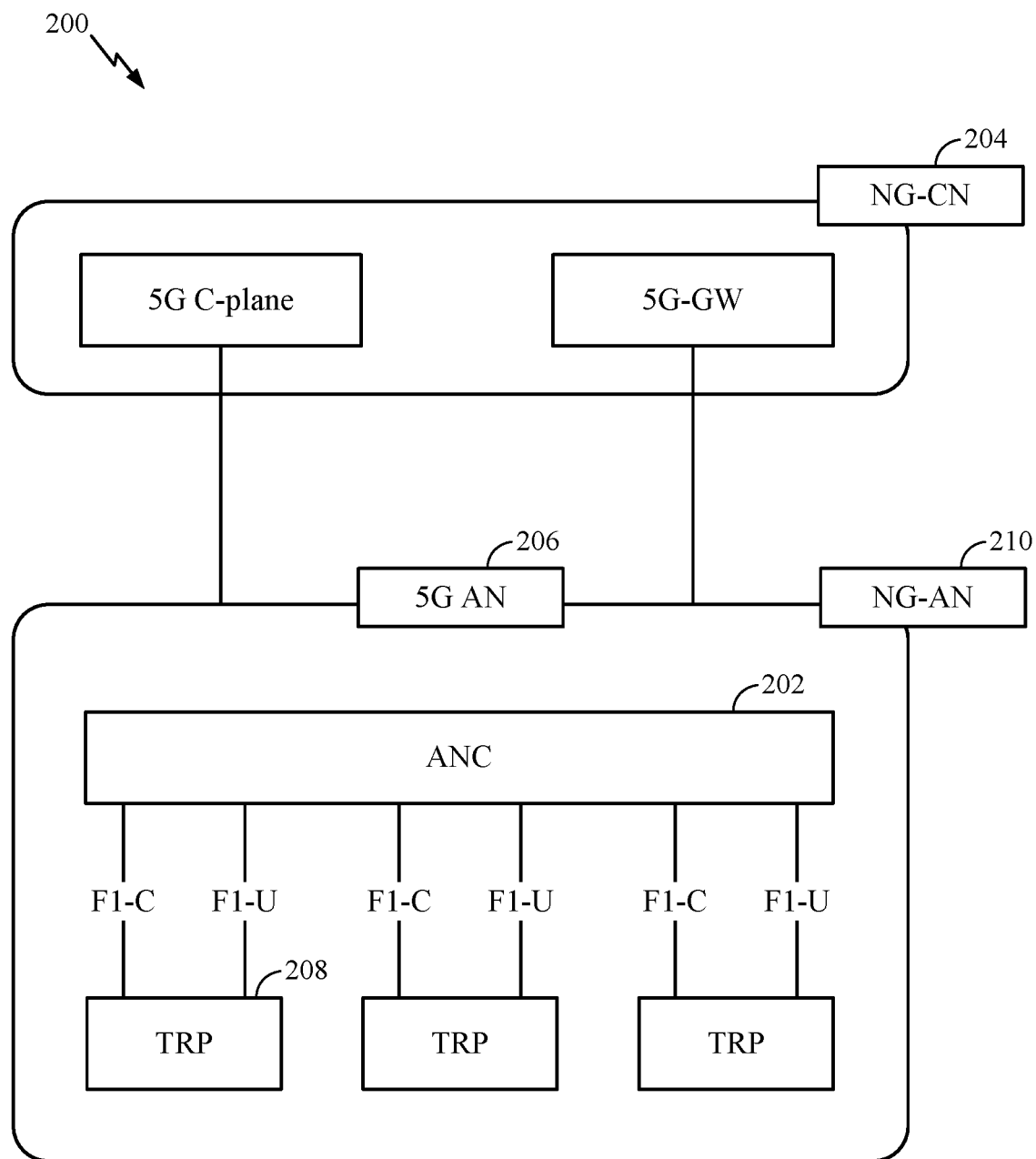
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/ or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/ present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
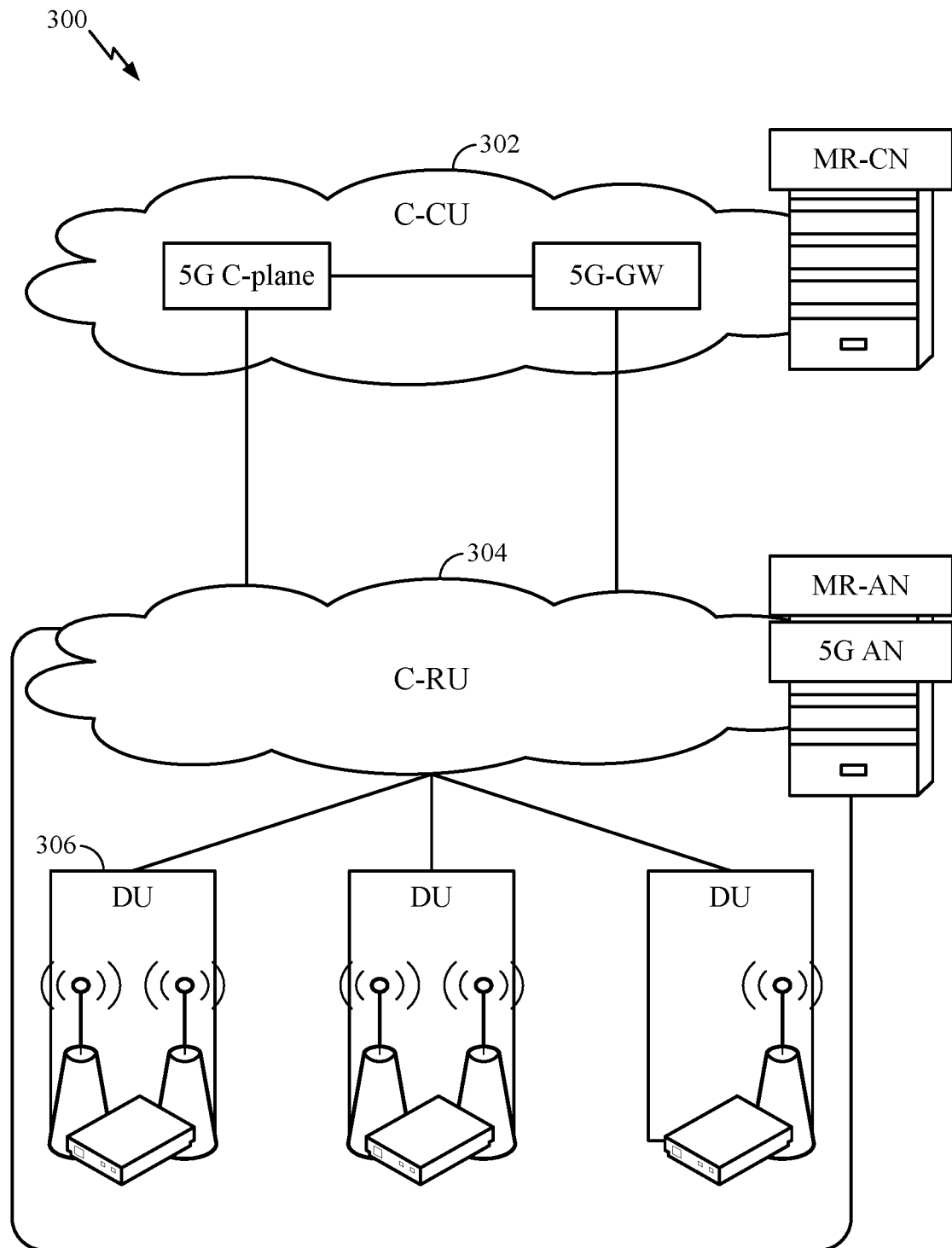
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
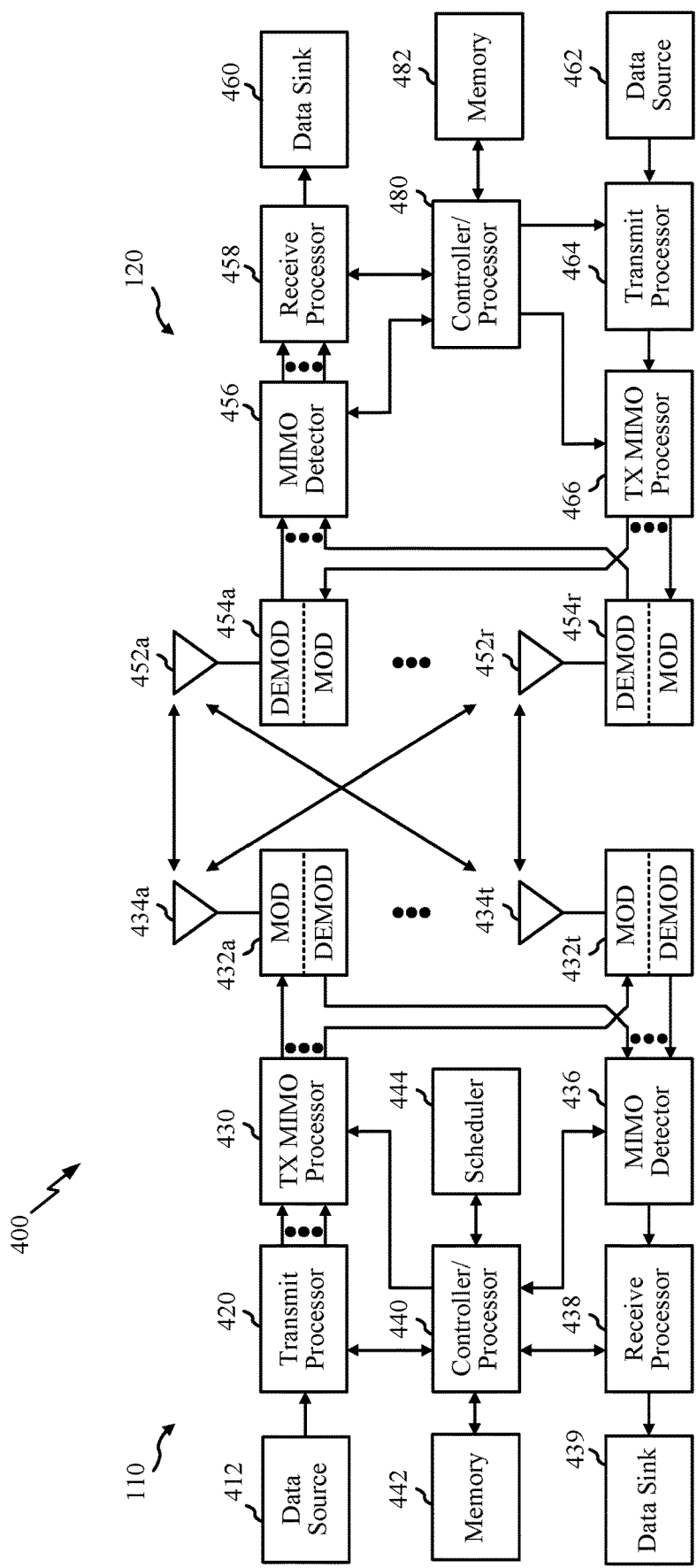
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. One or more components of the BS 110 and UE 120 may be used to practice aspects of the present disclosure. For example, antennas 452, processors 466, 458, 464, and/or controller/processor 480 of the UE 120 and/or antennas 434, processors 430, 420, 438, and/or controller/processor 440 of the BS 110 may be used to perform the operations described herein and illustrated with reference to FIGS. 9 and 10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The controller/processor 440 and/or other processors and modules at the base station 110 may perform or direct, e.g., the execution of various processes for the techniques described herein, such as operations 900 in FIG. 9, operations 1000 in FIG. 10, etc. The controller/processor 480 and/or other processors and modules at the UE 120 may also perform or direct, e.g., the execution of the processes for the techniques described herein, such as operations 900 in FIG. 9, operations 1000 in FIG. 10, etc. The memories 442 and 482 may store data and program codes for the BS 110 and the UE 120, respectively. A scheduler 444 may schedule UEs for data transmission on the downlink and/or uplink.

Figure 5:
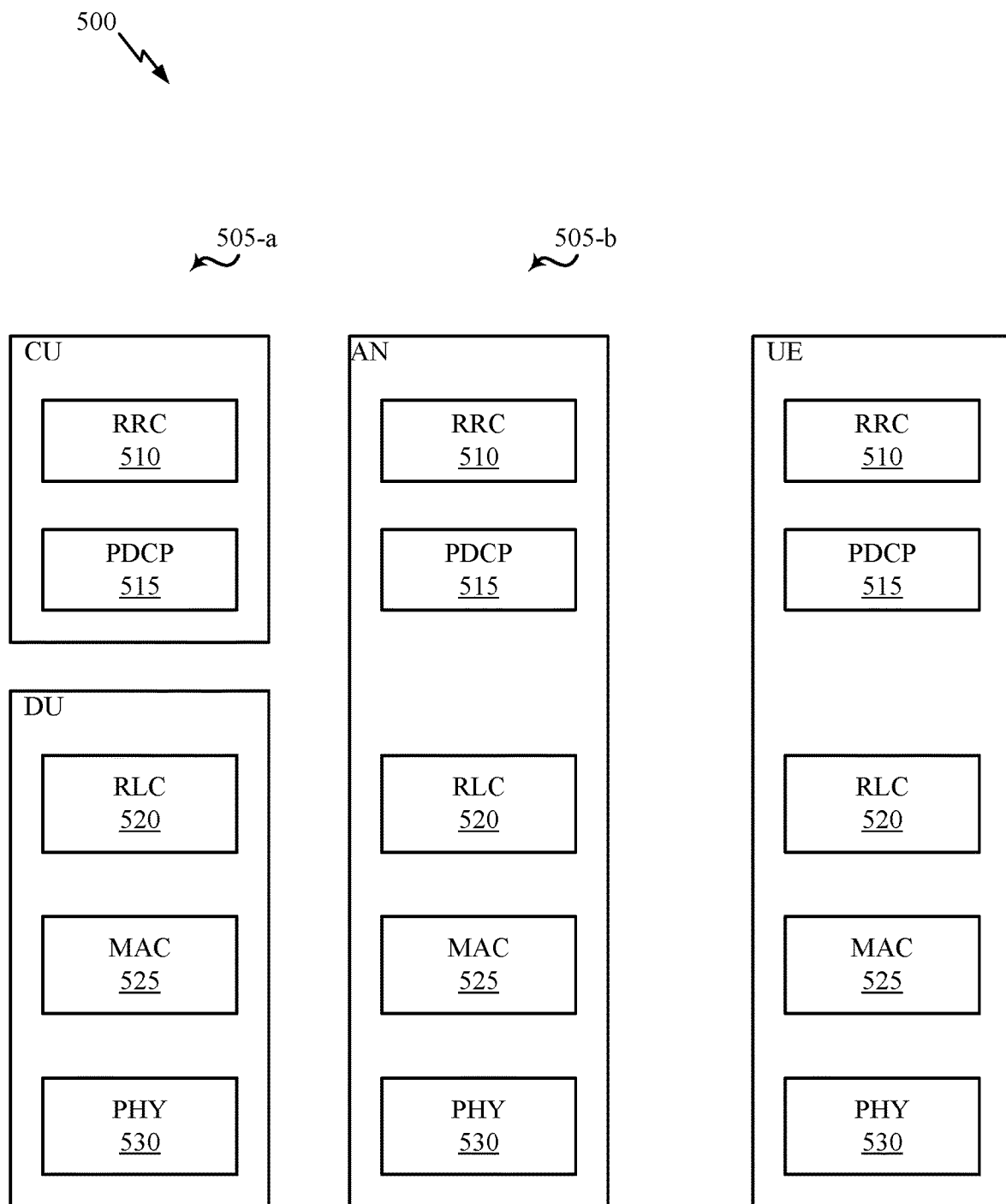
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
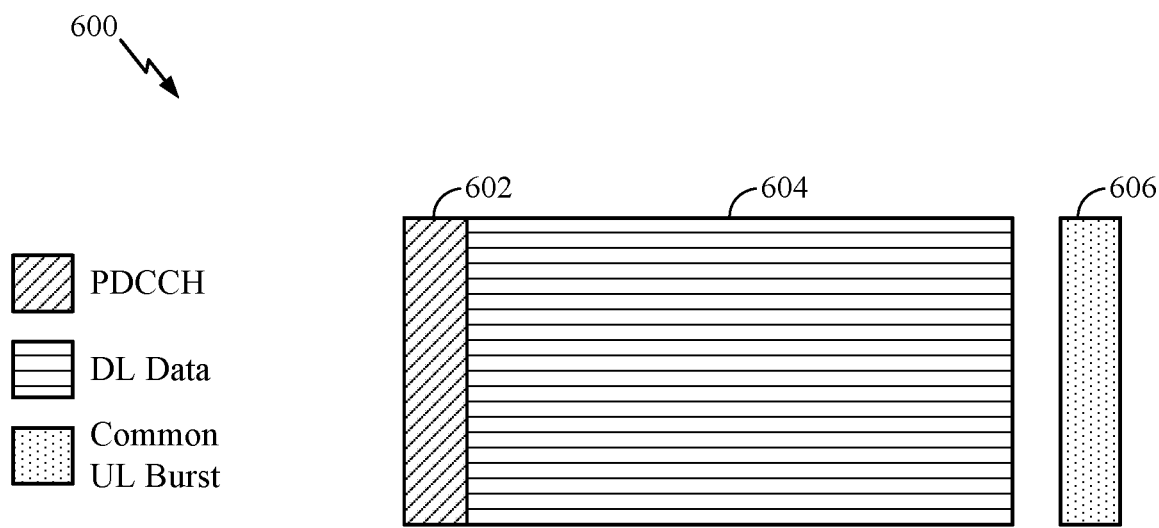
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
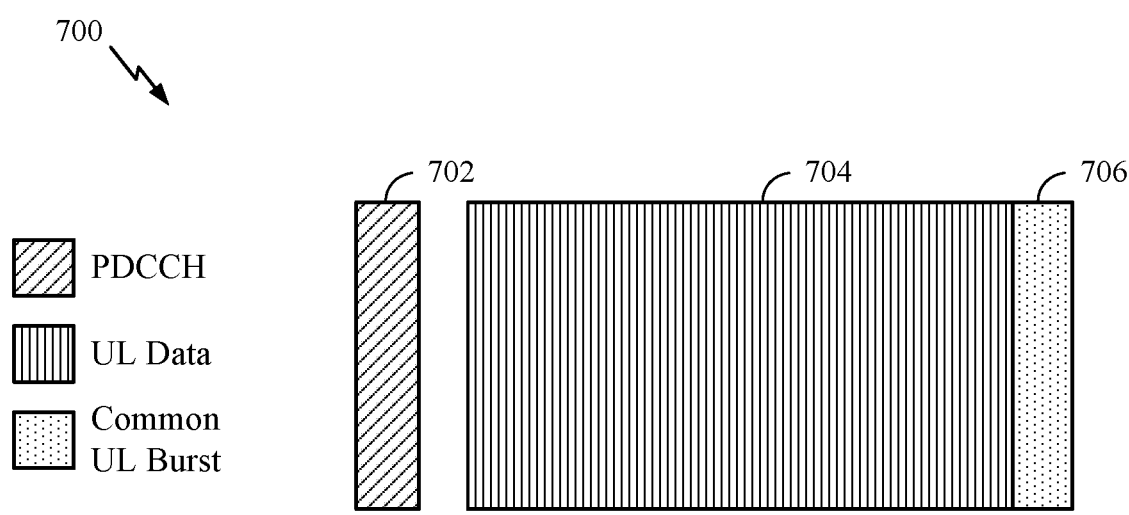
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein. In one example, a frame may include both UL centric subframes and DL centric subframes. In this example, the ratio of UL centric subframes to DL subframes in a frame may be dynamically adjusted based on the amount of UL data and the amount of DL data that are transmitted. For example, if there is more UL data, then the ratio of UL centric subframes to DL subframes may be increased. Conversely, if there is more DL data, then the ratio of UL centric subframes to DL subframes may be decreased.

Example Shared Spectrum Deployments

Example deployment scenarios for a shared spectrum, which may include use of an unlicensed radio frequency spectrum, may include operator-based deployments, a stand-alone mode of operation, and/or a dual-connectivity mode of operation. In an operator-based deployment, multiple operators may share a same frequency band. A stand-alone mode of operation may include inter-public land mobile network (PLMN) handover from a licensed carrier. A dual-connectivity mode of operation may include connectivity to a shared spectrum component carrier and to an anchor carrier on licensed spectrum.

Access in Unlicensed Spectrum

Medium access in an unlicensed spectrum may involve a dynamic listen before talk (LBT) procedure. Dynamic LBT procedures may allow sharing of network resources (e.g., frequency resources) on millisecond time scale. However, access to the medium may not be guaranteed, for example, in an asynchronous system. For asynchronous operation, the Node Bs (BSs) may have different frame timings, and transmissions from different Node Bs may not be aligned in time (e.g., one or more subframe and/or frame boundaries of different Node Bs may not be contemporaneously aligned).

A Wi-Fi asynchronous system design may be optimized for dynamic LBT procedures. In a Wi-Fi system, beacon transmissions (overhead signals, reference signals) may be subject to LBT. The periodic beacon signals may be "asynchronous" in nature. Beacon transmissions may not be transmitted frequently and receiving stations (STAs) may trigger asynchronous transmission of beacons in a Wi-Fi system.

STA-based mobility may be needed in an effort to compensate for poor radio resource management (RRM) due to, for example, the asynchronous nature of beacon transmissions. Data transmissions may each contain a preamble which may be used for synchronization and detection of the data burst.

Access in Licensed Spectrum

In 4G/LTE, medium access may be optimized for the licensed spectrum. Accordingly, "sensing" (e.g., monitoring or listening) to determine whether another network node is occupying a same RF band before communicating ("talking") on the RF band, in an effort to avoid interference, may not be required. 4G/LTE systems instead use a periodic transmission of overhead signals. RRM procedures exploit the periodic transmission of these overhead signals. Measurement reporting may be utilized for network-controlled mobility that may take into consideration radio conditions and system loading.

Battery life of UEs may be prolonged using a discontinuous reception (DRX) procedure, whereby a UE discontinuously receives information. During a DRX period, a UE may power down most of its circuitry, thereby saving power.

NR may be optimized for licensed spectrum. While 4G/LTE may not support a fast on/off procedure, where a transmitter-BS may communicate with a wireless device, quickly stop using portions of the spectrum, and quickly reestablish communication, NR system designs may support this feature.

Shared Spectrum Medium Access

A shared spectrum may attempt to minimize changes from the operation of the NR licensed spectrum in an effort to speed-up shared spectrum deployment. The shared spectrum may accommodate periodic transmissions of overhead and/or common channels. The shared spectrum may not make many changes to RRM and may exploit a fast on/off procedure. According to one example, a BS may communicate with a wireless device using a portion of the shared spectrum and may stop use of the shared spectrum, for example, to defer to a licensed transmitter. The BS may restart using the spectrum when the licensed transmitter stops use of spectrum resources.

Operation in a shared spectrum may include a network listen function at a Node B (BS). Deployments may protect overhead and/or common channels of other deployments. Stated otherwise, a node associated with a first spectrum and first operator may protect overhead and/or common channels transmitted by a node associated with a second spectrum and a second operator.

In a shared spectrum, the configuration used by other wireless devices may be learned by detecting and measuring a neighboring Node B's discovery reference signals (DRS) and/or broadcast channel (BCH). A DRS may include, for example, PSS, SSS, CRS, and/or CSI-RS. The shared spectrum may not use an LBT procedure for overhead signals and/or common channels.

A UE, operating in a shared spectrum, may perform an LBT procedure in an effort to access non-protected resources.

A Spectrum Access System (SAS) may allocate channels within and across tiers. These tiers may include, in order of priority, (1) incumbent licensees; (2) Priority Access licensees (PALs); and (3) General Authorized Access (GAA) operators. A shared spectrum may complement SAS server functionality with over-the-air mechanisms for channel selection.

Example Channel Reservation Signal with NR PDCCH Waveform

Channel reservation (CR) signals, in general, can be used to reserve portions of spectrum for communication. For example, certain wireless local area networks (e.g., WiFi) use the request to send (RTS) and clear to send (CTS) signals for channel reservation. Certain systems, such as NR, may also support a channel reservation signal exchange between nodes to allow for co-existence across the nodes. For example, in unlicensed and/or shared spectrum use of NR, channel reservation signals can be used to reduce collisions by transmissions across different nodes accessing the unlicensed/shared spectrum. In some aspects, the channel reservation signal exchange between nodes in NR may include an exchange of pre-grant (PG) messages, channel reservation for transmission (CR-T) signals, and channel reservation for reception (CR-R) signals.

The PG message may be transmitted by a BS and may include information indicating which nodes are scheduled for communication and include a (UL or DL) grant for the communication. The CR-T signals may announce the intent to transmit and include transmit power (e.g., power control) information regarding the upcoming data transmission. A node receiving a CR-T signal may determine (or estimate), based on the transmit power information in the CR-T signal, a level of interference it will receive from the transmitting node when the transmitting node sends the data transmission. The CR-R signals may announce the intent to receive a data transmission, and include information indicating at least one of the acceptable interference level (for the node transmitting the CR-R signal) or the transmit power information of the CR-R signal. A node receiving a CR-R signal may determine, based on the CR-R signal, a level of interference it will generate when transmitting, and determine whether the level of interference is acceptable to the node transmitting the CR-R signal.

Figure 8:
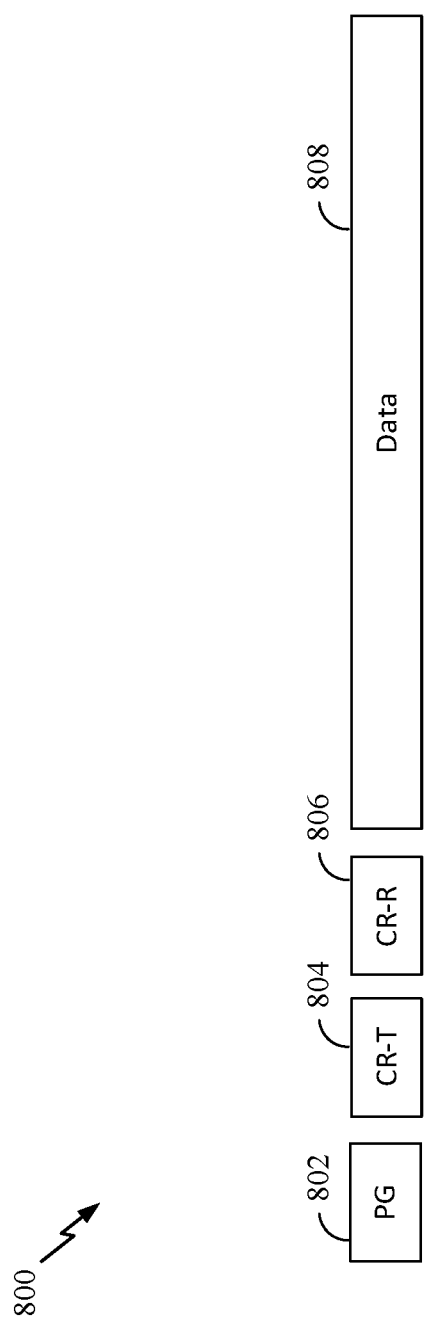
FIG. 8 illustrates an example frame structure that can be used for a channel reservation signal exchange in NR, in accordance with certain aspects of the present disclosure.

FIG. 8 illustrates an example frame structure 800 that can be used for a channel reservation signal exchange in NR, according to certain aspects of the present disclosure. As shown, the frame structure 800 may include a PG message burst at 802, a CR-T signal burst at 804, a CR-R signal burst at 806, and data transmission at 808.

One or more nodes (e.g., BSs) may transmit PG messages at 802 in order to schedule one or more other nodes (e.g., UEs) for communication during a portion of spectrum (e.g., data channel) at 808. As described in more detail below, the PG messages may be transmitted in parallel by one or more BSs (i.e., each PG message may be orthogonal in frequency with respect to other PG messages). The transmission of the PG messages may be followed by parallel transmission (e.g., by BSs and/or UEs) of CR-T signals (at 804), followed by parallel transmission (e.g., by BSs and/or UEs) of CR-R signals (at 806). In some cases, nodes may be configured to monitor for the CR-R/CR-T signals when the nodes are not scheduled for transmission. That is, nodes that are scheduled for transmission of CR-R signals at 806 may monitor for CR-T signals at 804. Similarly, nodes that are scheduled for transmission of CR-T signals at 804 may monitor for CR-R signals at 806.

In general, the approaches in some systems, e.g., such as WiFi, for transmitting channel reservation signals may not be appropriate in other systems, such as NR. For example, in WiFi, channel reservation signals (e.g., RTS/CTS) are generally transmitted in small packets, each about the size of a preamble. Transmitting such frames, however, in systems such as NR with large amounts of nodes can cause a significant amount of collisions, which in turn can degrade the detection of the channel reservation signals at receivers. Accordingly, a new design waveform for channel reservation signals in NR is desired.

Aspects of the present disclosure provide techniques and apparatus for a channel reservation signal design based on NR PDCCH.

Figure 9:
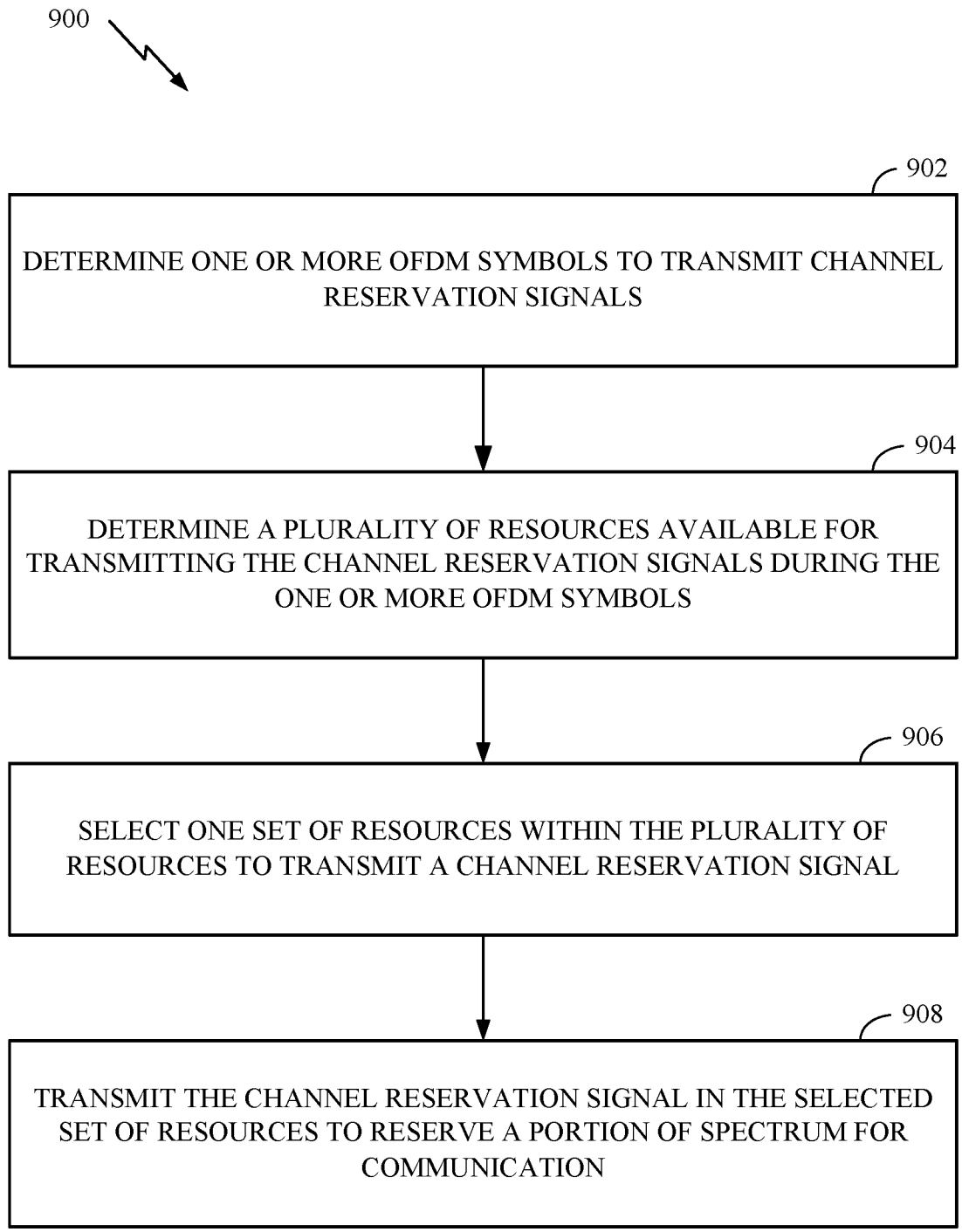
FIG. 9 is a flow diagram illustrating example operations that may be performed by a transmitting node, in accordance with certain aspects of the present disclosure.

FIG. 9 is a flow diagram illustrating example operations 900 that may be performed, for example, by a channel reservation (CR) transmitting node (e.g., BS 110, UE 120, etc.), in accordance with certain aspects of the present disclosure. Operations 900 may begin, at 902, where the CR transmitting node determines one or more OFDM symbols to transmit channel reservation signals.

At 904, the CR transmitting node determines a plurality of resources available for transmitting the channel reservation signals during the one or more OFDM symbols. The plurality of resources may use the same structure as a NR PDCCH. At 906, the CR transmitting node selects one set of resources within the plurality of resources to transmit a channel reservation signal. At 908, the CR transmitting node transmits the channel reservation signal (e.g., CR-T or CR-R) in the selected set of resources to reserve a portion of spectrum for communications. The portion of spectrum, for example, may correspond to a channel (e.g., data channel) being used for communications. Such communications may include sending a transmission or receiving a transmission. In one aspect, the CR transmitting node may send one CR signal (e.g., CR-T or CR-R) at a time. That is, the CR transmitting node may transmit a CR-T signal followed by a CR-R signal, or vice versa.

Figure 10:
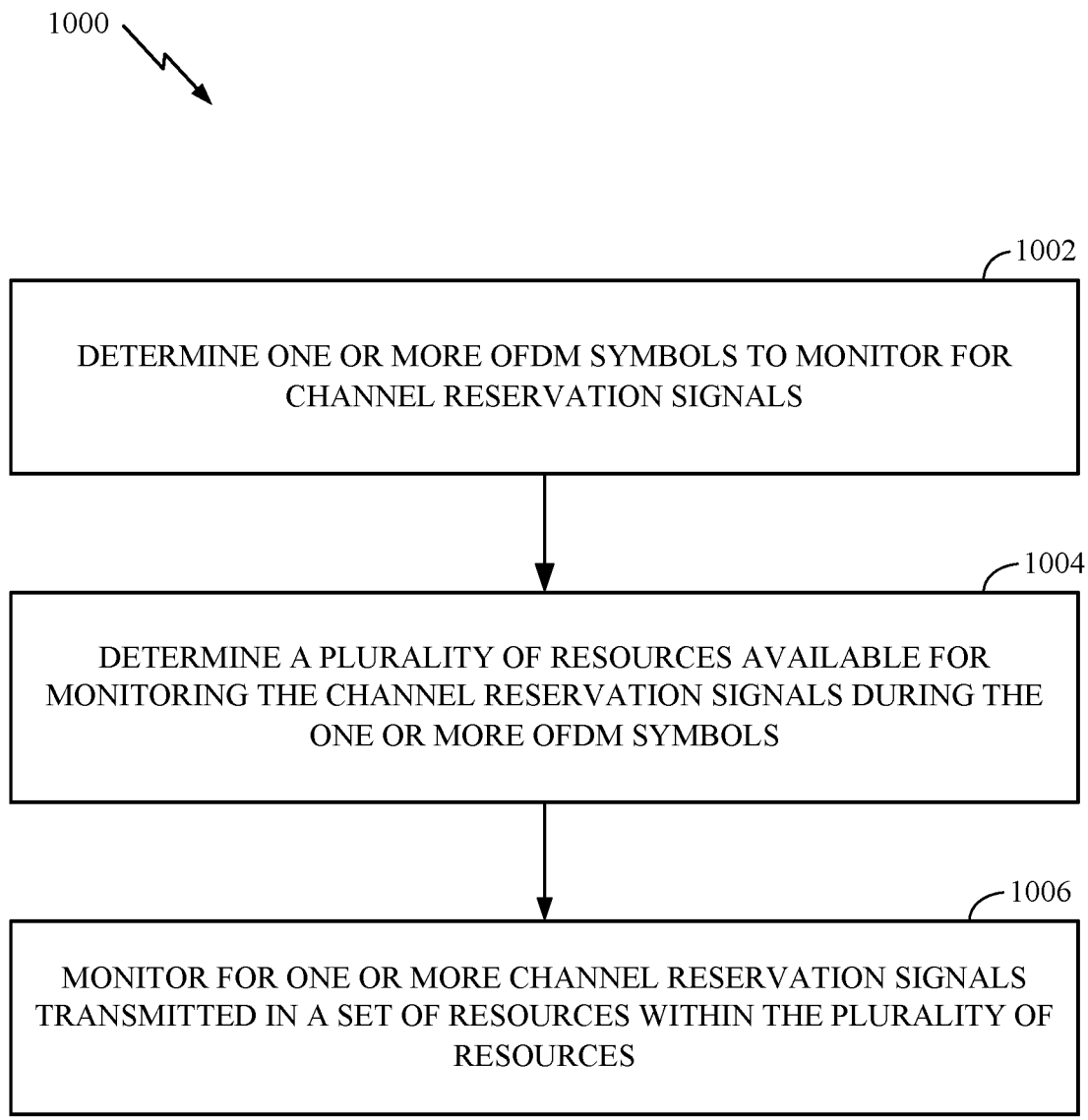
FIG. 10 is a flow diagram illustrating example operations that may be performed by a receiving node, in accordance with certain aspects of the present disclosure.

FIG. 10 is a flow diagram illustrating example operations 1000 that may be performed, for example, by a CR receiving node (e.g., BS 110, UE 120, etc.), in accordance with certain aspects of the present disclosure. Operations 1000 may begin, at 1002, where the CR receiving node determines one or more OFDM symbols to monitor for channel reservation signals (e.g., CR-T, CR-R, etc.). At 1004, the CR receiving node determines a plurality of resources available for monitoring for the channel reservation signals during the one or more OFDM symbols. In one aspect, the plurality of resources available for monitoring for the channel reservation signals use a structure of a downlink control channel (e.g., NR-PDCCH). At 1006, the CR receiving node monitors for one or more channel reservation signals transmitted in a set of resources within the plurality of resources.

In certain aspects, the plurality of resources used for the channel reservation signal transmission may use a structure of a downlink control channel (e.g., PDCCH) and include one or more control channel elements (CCEs). For example, in one aspect, the plurality of resources may include the UE-specific control subband in NR. The basic resource unit for the UE-specific PDCCH structure in NR is generally the physical resource block (PRB). For example, each NR PDCCH may occupy one or more NR-CCEs, and each NR-CCE may include one or more PRBs. The set of PRBs used for a particular NR PDCCH may be distributed over the control subband. A demodulation reference signal may be embedded in each PRB, and use the same beamforming as the control data in the PRB. The demodulation reference signal may be used by the UE for demodulation of the NR-PDCCH.

In general, for NR-PDCCH, different numbers of NR-CCEs may form the resource for downlink control information (DCI). The number of NR-CCEs in a NR-PDCCH generally refers to the NR-PDCCH's aggregation level. The aggregation level generally configures the coverage of the DCI and the amount of resource used for the DCI. Further, similar to legacy LTE, for NR PDCCH, one or more search spaces may be defined, where each search space includes a set of decoding candidates with one or more aggregation levels.

According to certain aspects, the UE-specific control subband in NR may be re-used for channel reservation signal transmissions. That is, the transmission of channel reservation signals in NR may apply similar PRB (with DRMS)/NR-CCE/decoding candidate concepts as those used for transmission of UE-specific DMRS based PDCCH in NR. In one aspect, the channel reservation signal transmissions can use the same coding and/or rate matching mechanism as NR-PDCCH. Compared to NR-PDCCH, however, the payload size of the channel reservation signal transmissions may be smaller (e.g., less information may be included in the channel reservation signals compared to typical DCI in PDCCH). This may translate to a lower aggregation level for CR transmission for the same coverage as NR-PDCCH.

In one aspect, the channel reservation signal (e.g., CR-T and/or CR-R) may occupy a set of resources used for one of the NR-PDCCHs. That is, one of the NR-PDCCHs may be replaced with a channel reservation signal. For the channel reservation signals, a search space that includes a set of decoding candidates may be defined. The channel reservation search space may be a common search space that is known to all nodes (e.g., BSs, UEs) in the communication system. For example, in one aspect, the search space can be semi-statically configured via broadcast signaling. The aggregation level used for each decoding candidate can be controlled based on the desired channel reservation signal coverage and control capacity.

According to certain aspects, the CR transmitting node may determine a plurality of decoding candidates for sending the channel reservation signals, where each decoding candidate includes one or more CCEs. The CR transmitting node can select one of the decoding candidates to use for sending the channel reservation signal. In some cases, the selected decoding candidate may be different from a decoding candidate used for the channel reservation signal transmission of another CR transmitting node. In some cases, the CR transmitting node may select the decoding candidate by randomly selecting a decoding candidate from the plurality of decoding candidates. The selected set of resources within the plurality of resources may include the CCEs of the selected decoding candidate. Each CCE may include one or more PRBs and each PRB may include a DMRS. Once selected, the CR transmitting node may generate a channel reservation packet, encode the packet with CRC insertion and fill the CR signal in the decoding candidate. The CR transmitting node may also multiplex DMRS in each PRB of the decoding candidate, and transmit the beam. As noted, the channel reservation signal may be a CR-T that indicates the communication (e.g., during a portion of spectrum) is for sending a transmission or a CR-R that indicates the communication (e.g., during a portion of spectrum) is for receiving a transmission.

In one aspect, when the CR receiving node monitors for channel reservation signals, it may perform a blind decoding of all decoding candidates in the channel reservation signal search space. For example, the CR receiving node may determine (e.g., based on a received configuration and/or higher layer signaling) a plurality of decoding candidates in the set of resources available for sending the channel reservation signals, where each channel reservation signal uses one of the plurality of decoding candidates. The CR receiving node may perform a blind decoding procedure across the plurality of decoding candidates for the one or more channel reservation signals. As noted, each decoding candidate may include one or more CCEs, each CCE may include one or more PRBs, and each PRB may include a DMRS.

The CR receiving node may process one of the decoding candidates used for one of the channel reservation signals based on the DMRSs. For example, the CR receiving node may use the DMRS inside each PRB for channel estimation, and perform a log likelihood ratio (LLR) computation for each PRB using the estimated channel. The receiving node may stitch together the LLRs for each decoding candidate and perform decoding. If the CRC passes, the receiving node may log the content.

Figure 11:
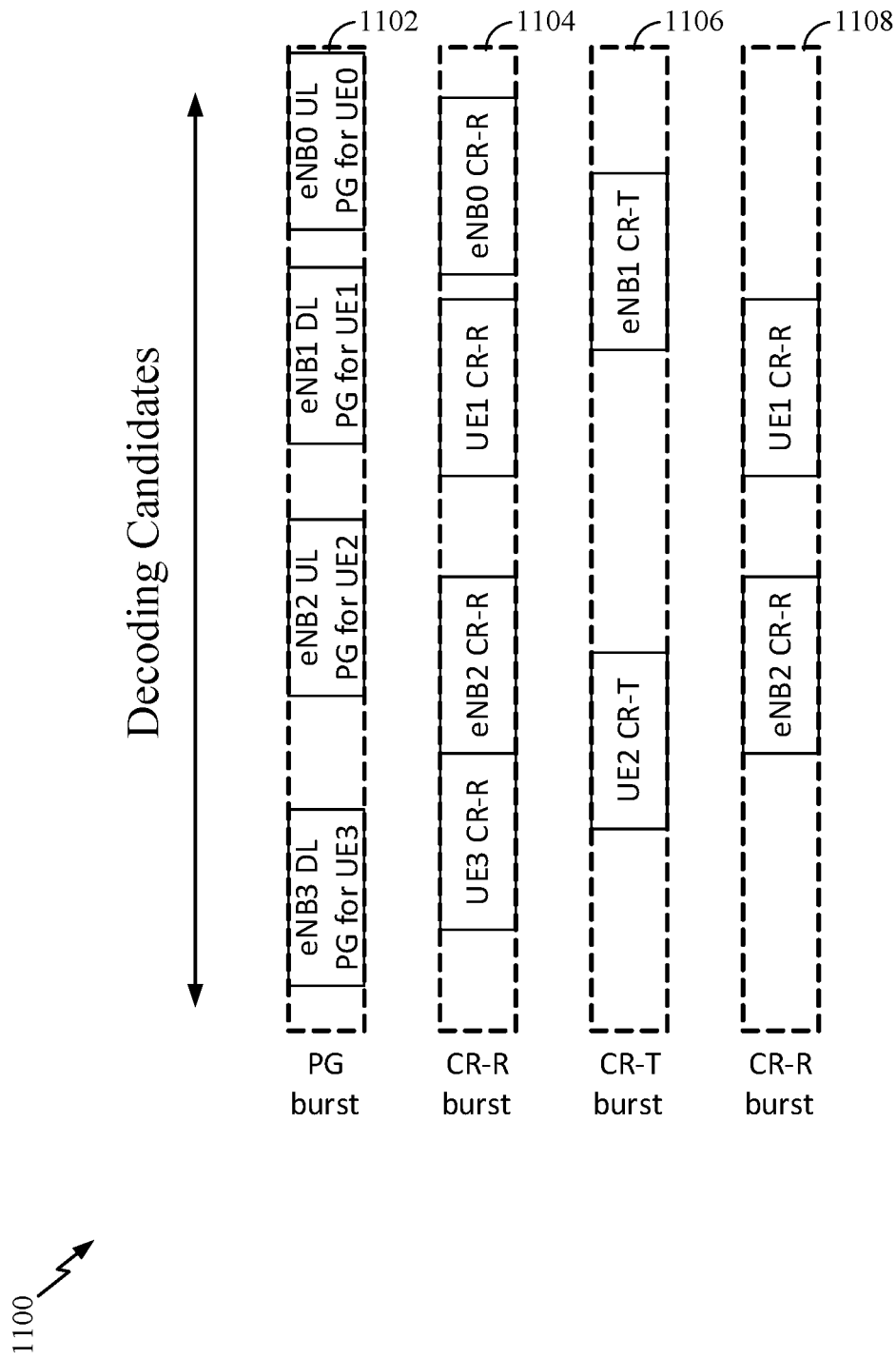
FIG. 11 illustrates an example of a channel reservation signal exchange in NR using resources in a UE-specific control subband, in accordance with certain aspects of the present disclosure.

FIG. 11 illustrates an example of a channel reservation signal exchange 1100 in NR using resources in a UE-specific control subband, according to certain aspects of the present disclosure. In this example, four links (e.g., $eNB_i$ to $UE_i$ for i=0, 1, 2, 3) between the eNB and UE are defined. The channel reservation signal exchange 1100 includes a PG burst at 1102, CR-R burst at 1104, CR-T burst at 1106, and CR-R burst at 1108. Note, however, that the depicted exchange 1100 is merely a reference example of a channel reference signal exchange that can be used. Those of ordinary skill in the art will recognize that other channel reference signal exchange configurations can be used.

In some aspects, CR transmitting nodes may transmit a grant message (e.g., such as a PG) to one or more devices (e.g., UEs, eNBs, etc.) before transmitting the channel reservation signal. The grant message may include a grant for at least one of uplink or downlink communications, and may indicate at least one of a time for each of the devices to transmit a channel reservation signal or a time for each of the devices to monitor for a channel reservation signal. Likewise, each device may monitor for a grant message in the resources (e.g., UE-specific control subband resources), and determine, based on a schedule in the grant message, a time for monitoring for one or more channel reservation signals.

As shown in FIG. 11, for example, in the PG stage at 1102, each $eNB_i$ sends a PG to a $UE_i$. Note each $eNB_i$ is a different transmitting node. The PG may schedule (e.g., include a grant) the $UE_i$ for communication (e.g., during a data channel) and may indicate whether the communication is a downlink transmission (e.g., from the $eNB_i$) or an uplink communication (e.g., from the UE). For example, the PG for $UE_0$ is for an uplink communication to $eNB_0$, the PG for $UE_1$ is for a downlink communication from $eNB_1$, the PG for $UE_2$ is for an uplink communication to $eNB_2$, and the PG for $UE_3$ is for a downlink communication from $eNB_3$.

From each UE's perspective, the PGs can be in a PG search space. In some cases, if the PG burst is shared with a normal grant burst, the PG search space can be a subset of (or the same as) a normal UE-specific or common search space the UE is monitoring (e.g., to save decoding attempts by the UE).

For the CR-R/CR-T burst, a CR search space may be defined that is common to all nodes. Each CR transmitting node may use one decoding candidate in the search space for the CR-T and/or CR-R transmission. In some cases, each CR transmitting node may select separate decoding candidates for the CR-T and/or CR-R transmission. At the CR-R burst at 1104, the $eNB_0$ sends a CR-R to prepare for data reception from $UE_0$, $UE_1$ sends a CR-R to prepare for data reception from $eNB_1$, $eNB_2$ sends a CR-R to prepare for data reception from $UE_2$, and $UE_3$ sends a CR-R to prepare for data reception from $UE_3$.

In one aspect, one or more transmitters of a channel reservation signal may select the same set of OFDM symbols to align the CR transmission. That is, a first CR transmitting node may select a same set of OFDM symbols chosen by at least a second CR transmitting node for a channel reservation signal transmission in order to align the channel reservation signal transmissions (e.g., by the first and at least second CR transmitting nodes). For example, as shown in FIG. 11, each CR-R transmission at 1104 may use the same set of OFDM symbols, each CR-T transmission at 1106 may use the same set of OFDM symbols, and so on. In one aspect, each decoding candidate used by a particular node for a CR-R/CR-T transmission may not overlap (e.g., in frequency) with another decoding candidate used by another node for a CR-R/CR-T transmission. For example, as shown in FIG. 11, the decoding candidates are not overlapping (e.g., are orthogonal). In some aspects, however, techniques presented herein may allow for one or more decoding candidates to overlap. In such cases, diversity and/or beamforming techniques may be used to reduce collisions between nodes transmitting the CR signals.

As mentioned above, one or more nodes may monitor for CR-R/CR-T signals when the nodes are not transmitting. Referring to the example in FIG. 11, $UE_0$, $eNB_1$, $UE_2$ and $eNB_3$ may monitor for the CR-R signals transmitted from $eNB_0$, $UE_1$, $eNB_2$ and $UE_3$, respectively, at 1104. In one aspect, one or more CR receiving nodes may select the same set of ODFM symbols (e.g., as one or more other CR receiving nodes) to monitor for channel reservation signals (e.g., in order to align the monitoring between the CR receiving nodes). Once received, each node may determine based on the information (e.g., transmit power information of the CR-R and/or acceptable interference level of the node transmitting the CR-R) embedded in the CR-R whether to accept their respective PG and proceed with transmission during the portion of the spectrum (e.g., data channel). For example, each CR receiving node can determine, based on the transmit power information, a pathloss measurement between itself and the CR transmitting node. Based on the pathloss measurement, the CR receiving node can determine the level of interference that will be received by the CR transmitting node due to a data transmission from the CR receiving node. If the determined level of interference exceeds the acceptable level interference of the CR transmitting node, the CR receiving node may decide to drop its PG.

As shown in FIG. 11, for example, at 1104, $UE_0$ (e.g., CR receiving node) receives a CR-R from $eNB_0$ (e.g., CR transmitting node) for a pending uplink transmission to $eNB_0$. Similarly, at 1104, $eNB_3$ (e.g., CR receiving node) receives a CR-R from $UE_3$ (e.g., CR transmitting node) for a pending downlink transmission from $eNB_3$. However, at 1106, $UE_0$ refrains from transmitting a CR-T to $eNB_0$ and $eNB_3$ refrains from transmitting a CR-T to $UE_3$. In this situation, $UE_0$ may have determined that the magnitude of interference for its pending uplink data transmission would have exceeded the acceptable level of interference for $eNB_0$ (e.g., indicated in the CR-R received from $eNB_0$). Similarly, $eNB_3$ may have determined that the magnitude of interference for its pending downlink communication would have exceeded the acceptable level of interference for $UE_3$ (e.g., indicated in the CR-R received from $UE_3$). Thus, at 1106, the CR-T burst may just include CR-T transmissions from $eNB_1$ and $UE_2$, respectively. At 1108, another CR-R burst occurs and includes CR-R transmissions from $UE_1$ and $eNB_2$.

In aspects, one difference of CR transmission from PDCCH transmission is that channel reservation transmissions may be transmitted from different nodes. As such, in some cases, there may be decoding candidate collisions when each node selects a decoding candidate and transmits a channel reservation signal using the selected decoding candidate. For example, the nodes may not be able to dynamically use different decoding candidates to avoid collisions as in the PDCCH case.

Accordingly, aspects presented herein provide techniques for avoiding (or reducing) collisions between channel reservation transmissions.

In one aspect, the CR transmitting node can use a randomized decoding candidate for channel reservation signal transmissions. That is, the CR transmitting node can randomly select a decoding candidate from the plurality of decoding candidates in the channel reservation signal search space. Using a randomized decoding candidate selection procedure may be desirable for mmW systems in NR. For example, in such systems, the collision problem may be less severe as different transmitters are beamformed differently. Thus, even if there is a collision on the NR-CCE usage, the interference can be suppressed by beamforming.

In some aspects, a CR transmitting node may identify at least one other decoding candidate used by another device (e.g., another CR transmitting node) for sending a channel reservation signal. The CR transmitting node may determine whether the selected decoding candidate collides with the decoding candidate used by the other device, and select another decoding candidate if there is a collision. For example, in one aspect, the CR transmitting node can use a semi-static collision avoidance algorithm to reduce collisions. In some cases, for example, a given node may use the same decoding candidate for both CR-R and CR-T transmissions. CR transmitting nodes, therefore, may monitor which decoding candidates are used by other CR transmitting nodes, and if a collision is detected (e.g., the node determines that a neighbor node is using the same decoding candidate), CR transmitting nodes can switch to a different decoding candidate. This approach may be desirable for CR transmitting nodes that have a certain number of active nodes in their neighborhood (e.g., within a threshold proximity).

As such, the techniques presented herein enable nodes to re-use the NR-PDCCH waveform for the transmission of channel reservation signals. Doing so allows for the PDCCH processing in hardware/firmware/software to be re-used for channel reservation signals in NR, and may avoid the need for a new channel design in NR.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "determining" encompasses a wide variety of actions. For example, "determining" may include calculating, computing, processing, deriving, investigating, identifying, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for determining, means for selecting, means for performing, means for using, means for sending, means for transmitting, means for receiving, means for configuring, means for identifying, means for obtaining, means for aligning, means for choosing, means for indicating, means for communicating, means for controlling, means for monitoring, means for processing and/or means for decoding may include one or more processors or other elements, such as the transmit processor 420, controller/processor 440, receive processor 438, MOD/DEMOD 432 and/or antenna(s) 434 of the base station 110 illustrated in FIG. 4, and/or the transmit processor 464, the controller/processor 480, the receive processor 458, DEMOD/MOD 454 and/or antenna(s) 452 of the user equipment 120 illustrated in FIG. 4.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by an apparatus, comprising:
    determining one or more orthogonal frequency division multiplexing (OFDM) symbols to transmit channel reservation signals;
    determining a plurality of resources available for transmitting the channel reservation signals during the one or more OFDM symbols by determining a plurality of decoding candidates within the plurality of resources available for sending the channel reservation signals during the one or more OFDM symbols, wherein each decoding candidate comprises one or more control channel elements (CCEs);
    selecting one set of resources within the plurality of resources to transmit a channel reservation signal, the selecting comprising selecting one of the decoding candidates to use for sending the channel reservation signal; and transmitting the channel reservation signal in the selected set of resources to reserve a portion of a spectrum for communication, wherein the selected set of resources comprises the one or more CCEs of the selected decoding candidate.

2. The method of claim 1, wherein the plurality of resources for the channel reservation signal transmission use a structure of a downlink control channel.

3. The method of claim 1, wherein selecting the one of the decoding candidates comprises randomly selecting the one of the decoding candidates from the plurality of decoding candidates.

4. The method of claim 1, further comprising:
identifying at least one other decoding candidate used by another device for sending a channel reservation signal;
determining whether the selected decoding candidate collides with the decoding candidate used by the other device; and
selecting another decoding candidate if there is a collision.

5. The method of claim 1, wherein:
each CCE comprises one or more physical resource blocks (PRBs); and
each PRB comprises a demodulation reference signal (DMRS).

6. The method of claim 1, wherein determining the one or more OFDM symbols comprises selecting a same set of OFDM symbols chosen by at least another device for a channel reservation signal transmission in order to align the channel reservation signal transmissions.

7. The method of claim 6, wherein the selected decoding candidate is different from a decoding candidate used for the channel reservation signal transmission of the other device.

8. The method of claim 1, wherein the channel reservation signal comprises a first channel reservation signal that indicates the communication is for sending a transmission, or a second channel reservation signal that indicates the communication is for receiving a transmission.

9. The method of claim 8, wherein the first channel reservation signal comprises power control information regarding the communication.

10. The method of claim 8, wherein the second channel reservation signal comprises power control information of the second channel reservation signal.

11. The method of claim 8, wherein:
the first channel reservation signal is transmitted at a same time as at least one other channel reservation signal from another device; and
the other channel reservation signal indicates a communication of the other device is for sending a transmission.

12. The method of claim 11, wherein the set of resources used for the first channel reservation signal does not overlap with a set of resources, within the plurality of resources, used for the other channel reservation signal.

13. The method of claim 8, wherein:
the second channel reservation signal is transmitted at a same time as at least one other channel reservation signal from another device; and
the other channel reservation signal indicates a communication of the other device is for receiving a transmission.

14. The method of claim 13, wherein the set of resources used for the second channel reservation signal does not overlap with a set of resources, within the plurality of resources, used for the other channel reservation signal.

15. The method of claim 1, further comprising transmitting a grant message to one or more user equipments (UEs) before transmitting the channel reservation signal, wherein the grant message comprises a grant for at least one of uplink or downlink communications and indicates at least one of a time for each of the one or more UEs to transmit a channel reservation signal, or a time for each of the one or more UEs to monitor for a channel reservation signal.

16. The method of claim 1, wherein the apparatus is a base station (BS) or a user equipment (UE).

17. A method for wireless communication by an apparatus, comprising:
determining one or more orthogonal frequency division multiplexing (OFDM) symbols to monitor for channel reservation signals;
determining a plurality of resources available for monitoring the channel reservation signals during the one or more OFDM symbols; and
monitoring for one or more channel reservation signals transmitted in a set of resources within the plurality of resources, comprising:
determining a plurality of decoding candidates in the set of resources available for sending the one or more channel reservation signals, wherein each channel reservation signal uses one of the plurality of decoding candidates and each decoding candidate comprises one or more control channel elements (CCEs); and
performing a blind decoding procedure across the plurality of decoding candidates for the one or more channel reservation signals.

18. The method of claim 17, wherein at least one of the channel reservation signals indicates that a communication during a portion of a spectrum is for sending a transmission.

19. The method of claim 17, wherein at least one of the channel reservation signals indicates that a communication during a portion of a spectrum is for receiving a transmission.

20. The method of claim 17, wherein determining the one or more OFDM symbols comprises selecting a same set of OFDM symbols chosen by at least another device for monitoring for a channel reservation signal in order to align monitoring of the channel reservation signals.

21. The method of claim 17, wherein:
each CCE comprises one or more physical resource blocks (PRBs); and
each PRB comprises a demodulation reference signal (DMRS).

22. The method of claim 21, further comprising processing one of the decoding candidates used for one of the channel reservation signals based on the DMRSs.

23. The method of claim 17, wherein the plurality of resources available for monitoring for the channel reservation signal use a structure of a downlink control channel.

24. The method of claim 17, further comprising:
monitoring for a grant message in the plurality of resources; and
determining, based on a schedule in the grant message, a time for monitoring the one or more channel reservation signals.

25. The method of claim 17, wherein the apparatus comprises a base station (BS) or a user equipment (UE).

26. An apparatus for wireless communication, comprising:
means for determining one or more orthogonal frequency division multiplexing (OFDM) symbols to transmit channel reservation signals;

means for determining a plurality of resources available for transmitting the channel reservation signals during the one or more OFDM symbols, comprising means for determining a plurality of decoding candidates within the plurality of resources available for sending the channel reservation signals during the one or more OFDM symbols, wherein each decoding candidate comprises one or more control channel elements (CCEs);

means for selecting one set of resources within the plurality of resources to transmit a channel reservation signal, comprising means for selecting one of the decoding candidates to use for sending the channel reservation signal; and means for transmitting the channel reservation signal in the selected set of resources to reserve a portion of a spectrum for communication, wherein the selected set of resources comprises the one or more CCEs of the selected decoding candidate.

27. An apparatus for wireless communication, comprising:

means for determining one or more orthogonal frequency division multiplexing (OFDM) symbols to monitor for channel reservation signals;

means for determining a plurality of resources available for monitoring the channel reservation signals during the one or more OFDM symbols; and means for monitoring for one or more channel reservation signals transmitted in a set of resources within the plurality of resources, the means for monitoring comprising:

means for determining a plurality of decoding candidates in the set of resources available for sending the one or more channel reservation signals, wherein each channel reservation signal uses one of the plurality of decoding candidates and each decoding candidate comprises one or more control channel elements (CCEs); and means for performing a blind decoding procedure across the plurality of decoding candidates for the one or more channel reservation signals.

* * * * *